June 23, 1964   E. C. THOMPSON   3,138,759
PULSE SPACING DETECTION CIRCUIT
Filed Nov. 23, 1960   3 Sheets-Sheet 1
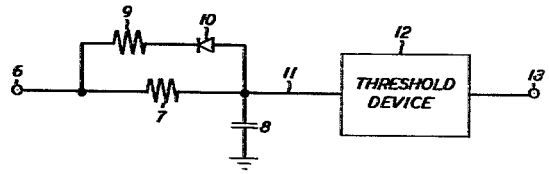
FIG. 1
PRIOR ART
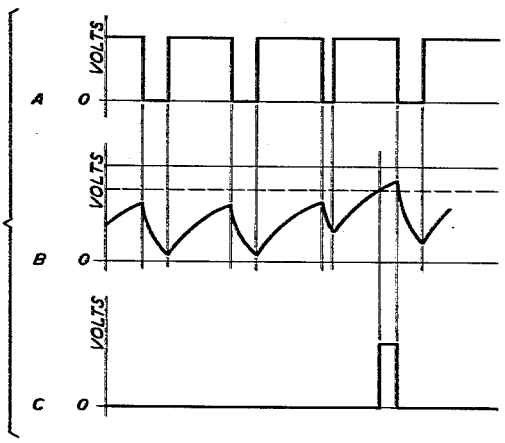
FIG. 2
FIG. 3
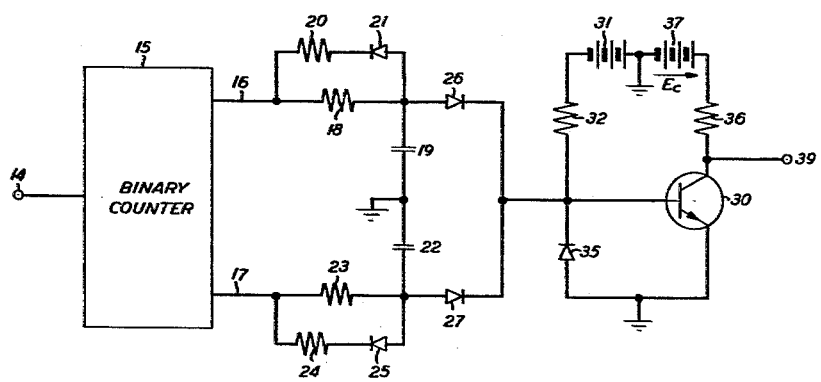
INVENTOR
E. C. THOMPSON
BY
R. B. Ardin
ATTORNEY INVENTOR
E. C. THOMPSON
BY R. B. Ali
ATTORNEY United States Patent Office 3,138,759
Patented June 23, 1964

3,138,759
PULSE SPACING DETECTION CIRCUIT
Eugene C. Thompson, Livingston, N.J., assignor to Bell
Telephone Laboratories, Incorporated, New York,
N.Y., a corporation of New York
Filed Nov. 23, 1960, Ser. No. 71,357
8 Claims. (Cl. 328—112)

This invention relates to condition responsive circuits and, more particularly, to circuits responsive to the time duration existing between adjacent pulses in a pulse train.

In data handling systems, it often becomes necessary to use an arrangement capable of detecting spacings between pulses whenever these spacings exist for a time duration greater than a predetermined value. To achieve this object, it has been common practice to employ a precision RC network as a time reference. In such a device, a source of voltage charges a capacitor toward some final value through a resistance. A threshold device arranged so that it will be triggered and deliver an output whenever the charge on the capacitor reaches a preset critical value is connected to the RC network. The incoming pulses are employed to discharge the capacitor before sufficient time has elapsed to allow the capacitor to absorb the charge necessary to trigger the device. Should a spacing between incoming pulses be larger than a critical duration, enough time does elapse to allow the capacitor to absorb a charge sufficiently large to trigger the threshold device and, consequently, an output is delivered. This method, while straightforward, suffers the serious disadvantage that incoming pulses must be of sufficient duration and magnitude to completely discharge the capacitor; consequently, this circuit is unsatisfactory in many modern systems employing the short duration pulses necessary at very rapid pulse rates.

It is, therefore, an object of this invention to detect a spacing between adjacent pulses in a pulse train whenever the time duration of the spacing is greater than a predetermined value even though the pulses be arbitrarily narrow.

It is a further object of this invention to detect a time duration existing between the leading edges of adjacent pulses in a pulse train whenever this duration is greater than a predetermined value.

A more specific object of this invention is to detect the absence of a pulse from a train of pulses which normally are substantially evenly spaced and of equal width even though the pulse widths be arbitrarily small.

In accordance with a principal feature of the present invention, these and other objects are realized by utilizing a bistable regenerative device in combination with a bilateral time-reference network. The advantages possessed by the invention described herein result from the fact that it utilizes the off-time of the pulse train as well as the on-time to return the time-reference network to its initial state. The invention thus makes possible the analysis of pulse trains in which each pulse is of such narrow width as to make detection by previous methods extremely difficult if not, indeed, impossible.

A more complete appreciation of the advantages and objects of the invention along with a fuller understanding of the invention may be obtained from a study of the following detailed description of a typical prior art circuit and of two specific embodiments of the invention.

In the drawings:

FIG. 1 illustrates a typical time-referenced pulse detection circuit of the type found in the prior art;

FIG. 2 illustrates voltage wave forms existing within the prior art circuit shown in FIG. 1;

FIG. 3 illustrates a simplified embodiment of a time-referenced pulse detection circuit embodying the invention;

Figure 4:
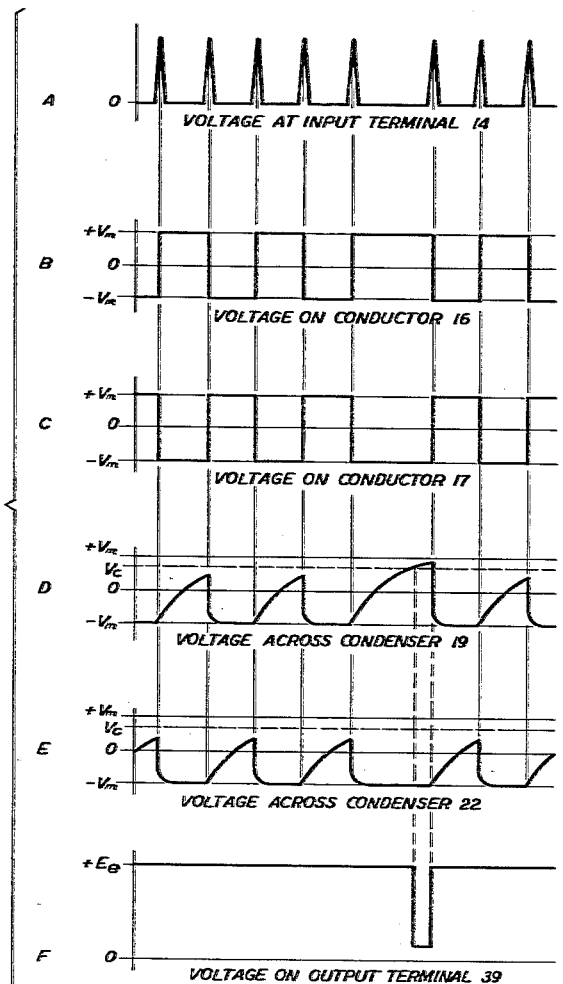
FIG. 4 illustrates voltage wave forms appearing within the embodiment illustrated in FIG. 3.

The device illustrated in FIG. 1 is a simplified version of a typical circuit which has previously been used to detect spacings between adjacent pulses greater than the specified value. The incoming pulses are applied to input terminal 6. Input terminal 6 is connected to one end of resistance 7. The other end of resistance 7 is connected to condenser 8. Resistance 9 and diode 10 are connected in series across resistance 7. The other end of condenser 8 is attached to ground. The input conductor 11 of the threshold device 12 is connected to the juncture of resistance 7 and condenser 8. Threshold device 12 is a commonly known device, such as a gas discharge tube circuit, whose output voltage state changes abruptly when the input voltage rises above a predetermined value. Threshold device 12 is equipped with an output conductor 13.

The incoming pulse train of the type shown in line A of FIG. 2 periodically discharges condenser 8 through resistance 9 and diode 10 in series. To simplify the illustration, the incoming pulses are assumed to be negative-going with their negative peaks clamped to zero. During the off-time of the pulse train, a positive voltage exists on the input terminal 6. The trailing edges of each individual pulse leave the condenser in a substantially uncharged condition. During the time when a pulse is not being applied to terminal 6, condenser 8 charges through resistance 7. The discharge time constant determined by the product of resistance 9 and the capacitance of condenser 8 is considerably less than the charge time constant determined by the product of resistance 7 and the capacitance of condenser 8. This allows condenser 8 to be discharged by the incoming pulses in a much shorter time than required for the charging operation. Since condenser 8 is being charged toward some final positive value during the off-time of the pulse train, the threshold device 12 may be arranged to be triggered when the voltage across condenser 8 reaches some preset magnitude. If this preset voltage is set at some arbitrary value having a smaller magnitude than the final value to which the condenser is being charged, the threshold device will be triggered at some predetermined time from the occurrence of the last input pulse. In this manner, unusually long spacings between adjacent pulses may be detected. However, should any incoming pulse be of such short duration that it is unable to completely discharge condenser 8 (i.e., the time constant determined by the product of resistance 9 and the capacitance of condenser 8 is not considerably less than duration of the incoming pulse) the time reference circuit may materially suffer in accuracy. Such an effect is shown in line B of FIG. 2 where the third pulse, being narrower than the others, results in the emission of an output signal even though the space between pulses is constant. While the pulse widths and the discharge rates shown in FIG. 2 have been exaggerated for instructional purposes, the figure does point out the problem which arises. Though the discharge time constant may be lessened by decreasing resistance 9, this resistance must remain large enough to protect diode 10 from large current surges. Even if resistance 9 could be eliminated, the forward resistance of diode 10 would still remain, resulting in a time constant which might be objectionably large.

Suppose, for instance, that the pulse train which it is desired to inspect contains pulses of one microsecond duration and that the pulse repetition rate is of the order of 1800 pulses per second. In this case a discharge time constant of around .2 microsecond, approximately 1/2800 of the charge time constant, would be required. In the present state of the art this requirement is extremely difficult to meet.

FIG. 3 illustrates a specific embodiment of the present invention which circumvents this problem. The incoming pulses are applied to input terminal 14 of binary counter 15. The binary counter has two output conductors 16 and 17 which are applied to a bilateral RC time reference network. Output conductor 16 is connected through resistance 18 and condenser 19 in series to ground. Resistance 20 and diode 21 in series are connected in parallel with resistance 18. Similarly, output conductor 17 is connected to a congruent network made up of condenser 22, resistances 23 and 24, diode 25, and the interconnections thereof. Diode 26 is connected from the juncture of resistance 18 and condenser 19 to the base electrode of transistor 30 such that it will be in a conducting state when the voltage at the juncture of resistance 18 and condenser 19 is positive with respect to the voltage at the base of transistor 30. Diode 27 is connected in a similar manner between the juncture of resistance 23 and condenser 22 to the base electrode of transistor 30. The base electrode of transistor 30 is also connected to the negative terminal of battery 31 through resistance 32. Diode 35 connects the base electrode of transistor 30 to ground such that the diode 35 is in a conducting state whenever the voltage at the base of transistor 30 is negative with respect to ground potential. The collector electrode of transistor 30 is connected through resistance 36 to the positive terminal of battery 37. A circuit path is provided from the emitter electrode of transistor 30 to ground. Output conductor 39 is connected to the juncture of resistance 36 and the collector electrode of transistor 30.

In order to simplify the discussion, it will be assumed that each output conductor of the binary counter may exist in one of two voltage states, the voltage on each conductor being of equal magnitude but of opposite polarity to the voltage existing on the other conductor. As shown in FIG. 4, each pulse of the incoming pulse train reverses the potential on each output conductor. For purposes of discussion, assume the voltage on conductor 16 is $-V_m$ at $t=0$, as shown in line B of FIG. 4.

At this time, a voltage of opposite polarity, $+V_m$, exists on conductor 17, as shown in line C of FIG. 4. Assume also that the condenser 19 has had sufficient time to reach a substantially steady-state voltage $-V_m$, as shown in line D of FIG. 4. Condenser 22, on the other hand, is in the process of charging toward $+V_m$, as shown in line E. Before condenser 22 charges to a critical positive value corresponding to $+V_c$, the first pulse arrives at input terminal 14, reversing the voltages on conductors 16 and 17. At this instant the voltage on conductor 17 becomes negative, forward biasing diode 25 and allowing condenser 22 to discharge rapidly through resistance 24. Note that the invention does not require that condenser 22 be completely discharged while the pulse is being applied. The only requirement is that the condenser reach a substantially steady-state value before the arrival of the next pulse.

Condenser 19 now charges toward a value corresponding to $+V_m$ as did condenser 22 before; however, a pulse again arrives to reverse the state of the output conductors before the voltage across condenser 19 reaches the critical value $+V_c$. This process continues until a spacing between pulses arrives at the input which is long enough to allow either condenser to charge to a voltage greater than $+V_c$. In FIG. 4, an unusually long spacing occurs between the fifth and sixth pulses. As a result the voltage across condenser 19 rises to a value sufficient to forward bias diode 26 and to cause transistor 30 to begin conduction. As transistor 30 begins to conduct, the voltage at terminal 39 drops to nearly ground potential, as shown in line F of FIG. 4. Thus the invention delivers an output pulse whenever the spacing between adjacent pulses is greater than a predetermined value even though each pulse may be extremely narrow. Any pulse capable of acting on a binary counter, multivibrator, or the like such that it reverses state will operate the invention. It should be noted that the invention operates independently of pulse width since it is triggered by the leading edges of the pulses and is, consequently, responsive to the spacing between leading edges of adjacent pulses.

In FIG. 3, diodes 26 and 27 have been employed to isolate the time reference circuit from the loading effects of transistor 30. Diode 35 and resistance 32 are used to clamp the base electrode to a negative voltage equal to that bias necessary to forward bias diode 35. Consequently, the accuracy of the time reference network is substantially unaffected by the transistor output switching circuit.

Figure 5:
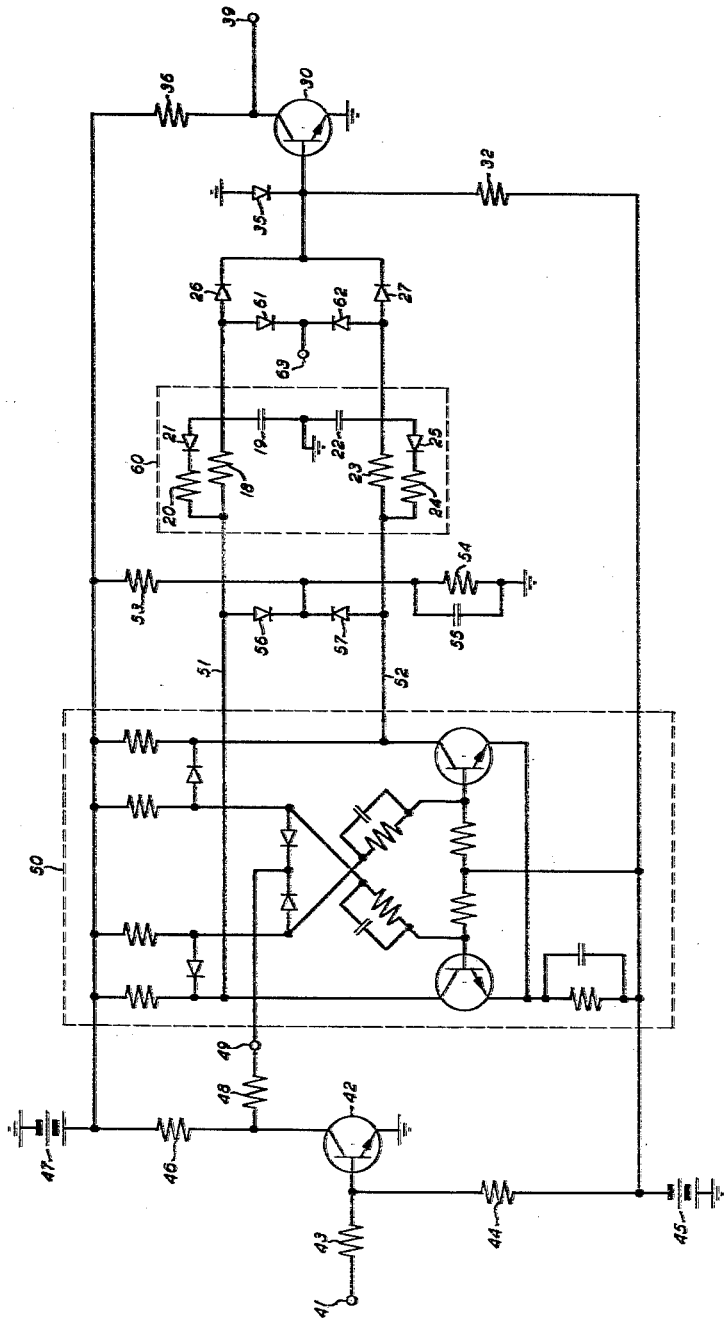
FIG. 5 illustrates a more detailed time-referenced pulse circuit embodying the invention.

FIG. 5 illustrates a more detailed embodiment of the invention. In FIG. 5, input terminal 41 is connected to the base electrode of transistor 42 through resistance 43. Resistance 44 connects the juncture of resistance 43 and the base electrode of transistor 42 to the negative terminal of battery 45. Resistance 46 connects the collector electrode of transistor 42 to the positive terminal of battery 47. Resistance 48 connects the juncture of resistance 46 and the collector electrode of transistor 42 with the input terminal 49 of binary counter 50. Transistor 42, resistances 43, 44, 46 and 48 and the interconnections thereof make up a common inverter circuit which is used to transform the positive-going input pulses into the negative going pulses required to trigger the binary counter which has been employed. A complete description of this type of binary counter is given in detail in U.S. Patent 2,787,-712 which issued to H. F. Priebe, Jr., et al., on April 2, 1957, and will not be included here. This binary counter is a fast rise-time device delivering substantially square-shaped output pulses. The binary counter is equipped with output conductors 51 and 52. Resistances 53 and 54 are connected in series from the positive terminal of battery 47 to ground. Condenser 55 is connected in parallel with resistance 54. Diode 56 is connected from output conductor 51 to the juncture of resistances 53 and 54. Similarly, diode 57 is connected from output conductor 52 to the juncture of resistances 53 and 54. Diodes 56 and 57, resistances 53 and 54, condenser 55 and the interconnections thereof are used to limit the positive voltage states existing alternately on output conductors 51 and 52 to a preset value. This clamping operation is employed to insure minimum variation in the magnitude of the positive voltage state. Output conductors 51 and 52 are connected to the input of the bilateral time reference network 60. The operation of this network and of the output switch is similar to the operation of the network described in detail in the previous discussion of FIG. 3, and identical reference numerals have been used on corresponding components. Diode 61 is connected from the juncture of resistance 18 and condenser 19 to terminal 63. Likewise, diode 62 is connected from the juncture of resistance 23 and condenser 22 to terminal 63. These diodes provide an enabling circuit since, unless a positive voltage is applied to terminal 63, diodes 61 and 62 will be forward biased and hence will render the circuit inoperative. Diode 26 is connected between the juncture of resistance 18 and condenser 19 to the base electrode of transistor 30. Diode 27 is connected from the juncture of resistance 23 and condenser 22 to the base electrode of transistor 30. Transistor 30, resistances 32 and 36, diode 35 and the interconnections thereof make up an output switch identical to that described in the previous discussion of FIG. 3.

With the exception of those refinements added to insure timing accuracy and to provide additional control, which have been previously mentioned, the operation of the specific embodiment of the invention illustrated in FIG. 4 is substantially identical to the operation of the circuit illustrated in FIG. 3.

It is to be understood that the arrangements which have been described herein are illustrative of the application of the principle of the invention. Numerous other arrangements may be devised by those skilled in the art without departing from the spirit and scope of the invention. For instance, an RL time reference network can be substituted for the RC network described herein, or various forms of inverters, bistable devices, threshold devices, etc., can be substituted for those components described.

What is claimed is:

1. Means for detecting those spacings between pulses in a pulse-train which are greater than a predetermined valve which comprises, in combination, a bistable regenerative device having an input conductor and two output conductors, means for applying said pulse-train to said input conductor to cause the voltage delivered to each of said output conductors to change from one level to another whenever a pulse in said pulse-train is applied to said input conductor, two separate time-reference networks each connected to one of said output conductors and each generating an electrical signal whose magnitude is monotonically related to the length of time the voltage delivered to the connected output conductor has existed at a single voltage level, and means for generating an output signal whenever a signal from one of said networks is greater than a predetermined value.

2. An arrangement of the type set forth in claim 1 wherein each of said time-reference networks comprises a point of reference voltage, a first resistance serially connected with a capacitor between the connected output conductor of said bistable device and said point of reference voltage and the series combination of a second resistance and a unidirectional conducting device connected in parallel with said first resistance, said first resistance having a substantially larger impedance than said first resistance.

3. An arrangement for detecting time displacements existing between the leading edges of adjacent pulses in a pulse-train whenever said displacements are greater than a predetermined value which comprises, in combination, a bistable regenerative device having an input conductor and two output conductors, means for applying said pulse-train to said input conductor of said bistable device, said bistable device being arranged such that the application of each pulse of said pulse-train to said input conductor causes the voltage existing on each of said output conductors to change abruptly from one predetermined voltage level to another, two time-reference networks each connected to one of said two output conductors and each generating a signal whose magnitude is monotonically related to the length of time the connected output conductor has existed at a given voltage level, and means for generating an output signal whenever the signal from one of said two time-reference networks rises above a predetermined value.

4. An arrangement of the type set forth in claim 3 wherein each of said time-reference networks comprises a point of reference voltage, a first resistance serially connected with a capacitor between the connected output conductor of said bistable device and said point of reference voltage and the series combination of a second resistance and a unidirectional conducting device connected in parallel with said first resistance, said first resistance having a substantially larger impedance than said first resistance.

5. In combination, a source of a train of pulses, a bistable regenerative device having an input and first and second outputs, means for applying said train of pulses to said input to cause the voltage delivered to each of said outputs to change abruptly from one predetermined level to another whenever the leading edge of a pulse in said train of pulses is applied to said input, a point of reference voltage, a first resistance and a first reactance connected between said first output and said point of reference voltage, a second resistance and a second reactance connected between said second output and said point of reference voltage, diode means for allowing each of said reactances to accumulate energy at a rate substantially different from the rate at which each of said reactances dissipate energy, means for developing a first voltage whose magnitude is directly related to the magnitude of energy stored in said first reactance, means for developing a second voltage whose magnitude is directly related to the magnitude of energy stored in said second reactance, means for selecting the larger of said first and said second voltages and for developing a third voltage whose magnitude is directly related to the larger of said first and said second voltages, and threshold means for delivering an output signal whenever said third voltage exceeds a predetermined value.

6. An arrangement of the type set forth in claim 5 wherein said diode means comprise the series combination of a third resistance and a first unidirectional conducting device connected in parallel with said first resistance, and the series combination of a fourth resistance and a second diode connected in parallel with said second resistance.

7. In combination, a pulse-train source, a bistable regenerative device having an input and at least first and second outputs, said multivibrator delivering one of two possible voltage levels to each of said outputs, means for applying said pulse-train from said source to said input such that the voltage at each of said outputs abruptly changes from one of said voltage levels to the other of said levels whenever the leading edge of a pulse in said train appears at said input, first time-reference means responsive to said first output for generating a first voltage whose instantaneous magnitude is monotonically related to duration of time having elapsed since said first output conductor exhibited a change in output voltage level, a second time-reference means responsive to said second output for generating a second voltage whose instantaneous magnitude is monotonically related to the elapsed time since said second output exhibited a change in output voltage level, means for selecting the larger of said first and said second voltages, and threshold means responsive to said selected voltage for generating an output signal whenever the magnitude of said selected voltage exceeds a predetermined level.

8. Apparatus of the type set forth in claim 7 wherein each of said time-reference means includes a capacitor, means for charging said capacitor at a first rate whenever the associated output of said multivibrator is at one of said voltage levels, means for discharging said capacitor at a second rate whenever the associated output of said multivibrator is in the other of said two possible voltage levels, said first rate and said second rate being unequal quantities, and means for generating a voltage related to the magnitude of energy stored in said capacitor.

References Cited in the file of this patent
UNITED STATES PATENTS

| | | |
|---|---|---|
| 2,461,956 | Beckwith | Feb. 15, 1949 |
| 2,787,712 | Priebe et al. | Apr. 2, 1957 |
| 2,997,665 | Sylvan | Aug. 22, 1961 |
| 2,999,948 | Beckwith | Sept. 12, 1961 |

OTHER REFERENCES

Seader: "A Self-Clocking System . . .," I.B.M. Journal, April 1957, pp. 181 to 184 (pp. 181 to 183 relied on).

Richards: Arithmetic Operations in Digital Computers, D. Van Nostrand, New York, 1955 (page 32 relied on).

Army TM 11–690, March 1959 (page 191 relied on).